TELEVISION SYNCHRONIZATION

Filed May 12, 1955

INVENTOR.
Richard A. Kraft
BY
Mueller & Aichele
Attys.

United States Patent Office 2,873,369

Patented Feb. 10, 1959

2,873,369

TELEVISION SYNCHRONIZATION

Richard A. Kraft, Elmhurst, Ill., assignor to Motorola, Inc., Chicago, Ill., a corporation of Illinois Application May 12, 1955, Serial No. 507,884

1 Claim. (Cl. 250—36)

Figure 1:
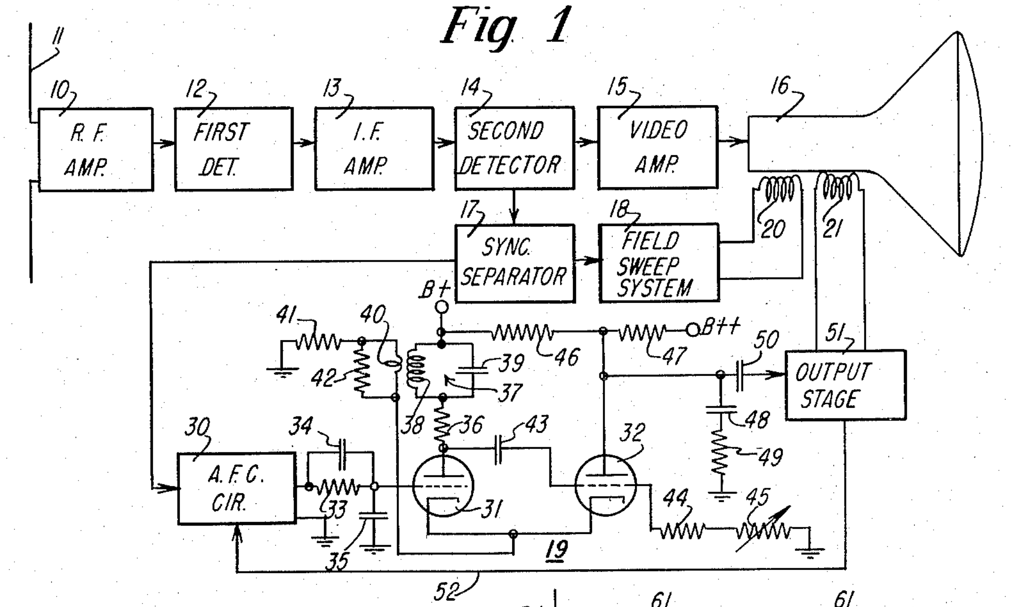

The present invention relates to television receivers, and more particularly to an indirectly synchronized sweep signal generating system for a television receiver and to a multivibrator type sweep signal generator for use in such a system.

It is usual in the line or horizontal sweep system of a television receiver to include an automatic frequency control (AFC) circuit for the sweep signal generator therein to provide some immunity to noise disturbances, and the like, in the synchronization of the generator with a received television signal. Such AFC circuits compare the saw tooth output signal of the sweep system with the synchronizing pulses of the received television signal to derive a unidirectional control voltage having amplitude variations corresponding to phase variations between the sweep signal and the synchronizing pulses. This control voltage is impressed on the sweep signal generator to control the frequency thereof so as to maintain the sweep signal synchronized with the received television signal. This type of automatic frequency control is such that noise disturbances have relatively little effect on the proper synchronization of the sweep system with the received television signal.

It is usual in many horizontal sweep systems to utilize a multivibrator as the sweep signal generator. The multivibrator has certain advantages in that it is capable of producing directly a sawtooth wave of sufficient power to drive the output stage of the system without the need of further amplification. However, controlled multivibrator circuits are usually relatively unstable, and subject to spurious operation from slight disturbances in the controlling signals. For example, a multivibrator controlled by a unidirectional automatic frequency control voltage, without further stabilization or compensation, has been found to exhibit spurious frequency variations to the residual noise components that find their way into such control voltage. In order to overcome the disadvantage of the extreme sensitivity and inherent instability of multivibrator circuits, resonant ringing circuits have been used as a stabilizing means therefor. Such a ringing circuit responds to the pulses generated by the multivibrator to devolop a sine wave ringing signal which controls the sensitivity of the electron discharge device of the multivibrator to which the control voltage is supplied so as to render that device essentially unresponsive to variations in the control voltage that do not occur around the free running triggering times of the natural period of the multivibrator.

In recent years, attempts have been made for economy reasons to design and construct television receivers that do not require a multiplicity of different unidirectional energizing voltage values, but which may be energized by a single relatively low unidirectional energizing voltage of the order, for example, of 125 volts (apart from the usual bootstrap voltage developed in the receiver). Such a construction requires that at least one of the electron discharge devices of the multivibrator in the horizontal sweep system be operated at such relatively low voltage. It is sometimes feasible to energize the output device of the multivibrator with the bootstrap voltage, but since the controlled input discharge device of the multivibrator usually consumes more power than the output device, the input device would place too high a load on the bootstrap source to enable it also to be energized therefrom so that it must be energized at the relatively low voltage.

It has been found with existing stabilizing circuits that insufficient stabilization is provided for the multivibrator when the controlled discharge device is operated at the relatively low D. C. energizing voltage of the economical low voltage television receiver. This arises since these stabilizing circuits usually take the form of resonant ringing networks, as previously noted, and it has been found preferable to include such networks in the anode circuit of the controlled multivibrator discharge device for satisfactory ringing operation. This necessitated, in prior arrangements, relatively high anode energizing potentials for adequate stabilization of the multivibrator.

It is, accordingly, an object of the present invention to provide an improved sweep system for a television receiver which includes a stabilized sweep signal generator that may be energized from a relatively low unidirectional energizing source, without adversely affecting its stabilized characteristics.

Another object of the invention is to provide such an improved sweep system that is relatively simple and economical in its construction, so as to render the system commercially feasible from a cost standpoint.

A feature of the invention is the provision in a sweep signal generating system of a stabilizing ringing network in the anode circuit of at least one of the electron discharge devices of a multivibrator included in the system, with a regenerative feedback network coupled to the ringing circuit and extending to the input circuit of the multivibrator to provide adequate stabilization for the multivibrator, even though the anode energizing potential of the discharge device has a relatively low value.

Figure 2A:
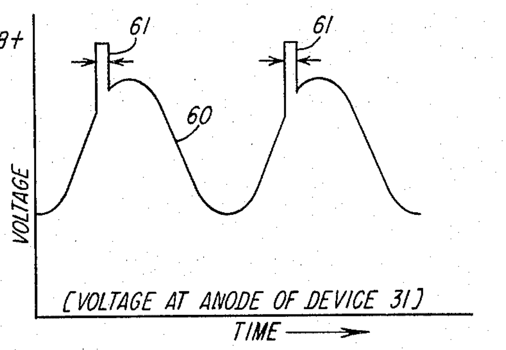
Figure 3:
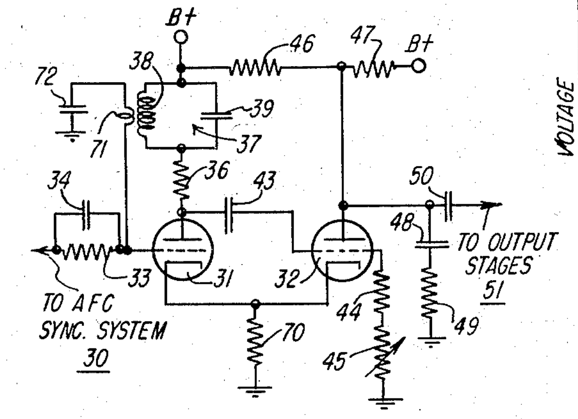
Figure 2B:
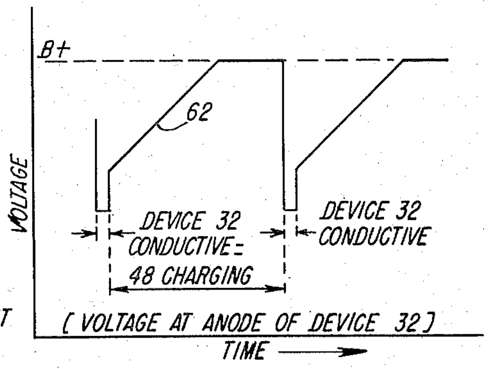

The above and other features of the invention which are believed to be new are set forth with particularity in the appended claim. The invention itself, however, together with further objects and advantages thereof, may best be understood by reference to the following description when taken in conjunction with the accompanying drawing in which:

Fig. 1 shows a television receiver incorporating the invention;

Figs. 2*a* and 2*b* are curves useful in explaining the operation of the invention; and Fig. 3 is a modification of the multivibrator of the invention.

The invention provides in an indirectly synchonized sweep-signal generating system for a television receiver, the combination of a source of a unidirectional automatic frequency control voltage, a multivibrator comprising first and second electron discharge devices each having anode, cathode and control electrodes; an input circuit coupling the source to the control electrode of the first device; an anode circuit connecting the anode of the first device to a source of unidirectional energizing potential; a parallel-resonant stabilizing ringing network included in said anode circuit; and a regenerative feedback network coupled to the ringing network for feeding energy from the anode of the first device to one of the other electrodes thereof.

The television receiver of Fig. 1 includes a radio frequency amplifier 10 having input terminals connected to an appropriate antenna 11, and having output terminals coupled through a first detector 12 to an intermediate frequency amplifier 13. The intermediate frequency amplifier is coupled through a second detector 14 and video amplifier 15 to a cathode-ray image reproducer 16. Second detector 14 is also connected to a synchronizing signal separator 17 which, in turn, is connected to a field sweep system 18 and to a line sweep system indicated generally 19. The output terminals of the field sweep system 18 and line sweep system 19 are connected respectively to the field deflection winding 20 and to the line deflection winding 21 of reproducer 16.

As is well known, the television receiver of Fig. 1 is constructed to utilize a television signal having video frequency components and line and field synchronizing components. Such a television signal is intercepted by antenna 11 and amplified by amplifier 10 when the receiver is conditioned to receive and utilize the signal. The amplified signal is heterodyned in first detector 12 to the selected intermediate frequency of the receiver, and the intermediate frequency signal from the first detector is amplified in amplifier 13 and detected in second detector 14 to produce a composite video signal. The composite video signal is amplified in video amplifier 15 and used to control the intensity of the cathode-ray beam in image reproducer 16.

The synchronizing components of the composite video signal are separated in synchronizing signal separator 17 from the composite signal, and the field synchronizing pulses are used to synchronize the field sweep system 18 and, therefore, the field deflection of the cathode-ray beam in reproducer 16. The line synchronizing pulses, on the other hand, are used to synchronize the line sweep system 19 and, therefore, the line deflection of the cathode-ray beam in image reproducer 16. The sound components of the receiver form no part of the present invention, and have not been shown.

The invention is concerned with the line or horizontal sweep system 19, and that system will be described in detail. The horizontal sweep system includes an automatic frequency control (AFC) circuit 30 which may be constructed in any known manner and, since units of this general type are extremely well known to the art, it is believed unnecessary to show the detailed connections thereof. AFC circuit 30 is connected through an input circuit to the control electrode of a controlled electron discharge device 31 wihch, together with an output electron discharge device 32, are connected as a multivibrator circuit. The input circuit referred to above includes a series resistor 33 shunted by a capacitor 34, and a capacitor 35 connects the control electrode of device 31 to a point of reference potential or ground.

The anode of device 31 is connected to the positive terminal B+ of a source of unidirectional energizing potential through an anode circuit including a resistor 36 and a parallel-resonant, stabilizing ringing network 37. Network 37 includes an inductance coil 38 and a shunt-connected capacitor 39. The energizing potential source B+ may have a relatively low voltage value which is used throughout the receiver as the only voltage value apart from the usual bootstrap voltage developed in the receiver.

The cathodes of devices 31 and 32 are connected together and to ground through an inductive winding 40 and resistor 41, winding 40 being inductively coupled to inductance coil 38 and being shunted by a resistor 42. The anode of device 31 is coupled to the control electrode of device 32 through a capacitor 43, and the last-mentioned control electrode is connected to ground through a pair of series connected resistors 44, 45, with resistor 45 being variable to constitute the horizontal hold control of the receiver.

The anode of device 32 is connected to the common junction of a pair of potentiometer resistors 46 and 47 connected between the positive terminal B+ and a further positive terminal B++. The latter terminal may be the usual bootstrap voltage source of the television receiver.

The anode of device 32 is connected to ground through a discharge capacitor 48 and a series-connected peaking resistor 49, and this anode is further coupled through a capacitor 50 to an output stage 51. The elements 46–50 may be considered the output circuit of the multivibrator. Output stage 51 may include any known circuit connection including a usual electron discharge device amplifier and a transformer coupling circuit. This output stage is so well known to the art that a detailed circuit representation thereof is believed to be unnecessary. A usual connection 52 extends from the output stage to the AFC unit 30 to supply the sawtooth sweep output signal to the AFC unit for comparison in any known manner with the line synchronizing pulses from synchronizing separator 17 to produce a unidirectional AFC control voltage.

As previously noted, the AFC circuit 30 compares the sawtooth sweep output signal and the line synchronizing pulses to develop a control voltage that is relatively immune to noise disturbances, but which has amplitude variations reflecting phase variations between the sawtooth signal and the line synchronizing pulses. This unidirectional automatic frequency control voltage is impressed on the controlled discharge device 31 of the multivibrator 31, 32 to control the frequency of the multivibrator and maintain it synchronized with the incoming television signal.

However, as also pointed out previously herein, controlled multivibrator circuits are generally unstable and sensitive to noise disturbances in the controlling signal. Because of this, the AFC circuit alone is not usually capable of providing noise-immune synchronous operation and stabilizing means is desirable. In the illustrated circuit, stabilization is achieved by means of the resonant ringing network 37 in the anode circuit of the controlled multivibrator discharge device 31. The ringing network is tuned to the free-running frequency of the multivibrator which, in turn, approximates the horizontal sweep frequency and, as shown in Fig. 2A, the ringing network causes the voltage at the anode of electron discharge device 31 to take on the illustrated wave form. That is, ringing network 37 develops a sine wave 60 having respective positive peaks occurring at times corresponding to the free-running triggering times of the multivibrator. This sine wave causes the anode potential of discharge device 31 to swing in such a manner that the device is sensitive to triggering only in the vicinity of free-running triggering times represented by pulses 61, these pulses being generated as device 31 is triggered to a non-conductive state.

As is well known, the frequency of multivibrator circuits of the general type shown in Fig. 1 may be synchronized by a unidirectional control voltage impressed on the control electrode of controlled discharge device 31. The multivibrator is so constructed that device 31 is non-conductive for successive short intervals of time ($t_1$) corresponding respectively to the width of pulses 61. Device 32, on the other hand, is conductive only for intervals ($t_2$) corresponding to the intervals at which device 31 is non-conductive (Fig. 2B). These intervals ($t_2$) correspond to the horizontal retrace intervals of the receiver.

A peaked sawtooth signal 62 is developed at the anode of device 32, due to the well-known action of discharge capacitor 48 and resistor 49. This sawtooth output signal is supplied to output stage 51 so as to produce a sawtooth sweep current in the horizontal deflection coil 21.

The free-running frequency of the multivibrator 31, 32 can be controlled by the variable resistor 45 which constitutes the horizontal hold control of the receiver. Without stabilization, any slight spurious variation in the unidirectional control voltage supplied to the control electrode of discharge device 31 would alter the frequency of the multivibrator. However, ringing circuit 37 causes device 31 to be sensitive only during intervals adjacent the actual free-running triggering times, as previously noted, so as to stabilize the system and render its synchronous operation immune for all practical purposes from the effect of noise disturbances and the like. It has been found, however, that when the value of the positive voltage B+ is reduced to a value of the order of, for example, of 125 volts, the voltage developed across ringing circuit 37 is insufficient to provide adequate stabilization of the multivibrators 31, 32. In the circuit of the present invention the regenerative feedback winding 40 introduces energy corresponding to the ringing signal into the more sensitive input circuit of the multivibrator. This feedback energy cooperates with the ringing signal in the anode circuit to stabilize the multivibrator. By this expedient, it has been found possible to obtain almost any degree of stabilization for the multivibrator and still furnish sufficient drive to the control grid of the output device 32.

As illustrated in Fig. 1, the anode of device 32 is returned to potentiometers 46, 47 connected between the unidirectional energizing potential terminal B+ and the bootstrap potential terminal B++. Because device 32 is conductive only for a small interval (corresponding to the retrace interval) its over-all power consumption is relatively low, permitting it to be operated from the bootstrap energizing source. However, since device 31 is conductive for the major portion of each cycle, it is not feasible (as previously noted) to energize that device from the bootstrap source due to the excessive load that would be placed on that source. For that reason, it is usual to return the anode of device 31 to the D. C. voltage energizing source of the receiver other than the bootstrap source. With the present invention, this other D. C. source can be established at a relatively low value for the previously discussed economy in construction of the television receiver.

In a constructed embodiment of the invention, the following values were used in the circuit:

| | | |
|---|---|---|
| B+ | volts | 125 |
| B++ | do | 350 |
| Resistor **46** | kiloohms | 180 |
| Resistor **47** | do | 180 |
| Resistor **41** | ohms | 560 |
| Resistor **42** | do | 180 |
| Capacitor **39** | micromicrofarads | 3300 |
| Resistor **33** | megohms | 4.7 |
| Capacitor **34** | microfarads | .003 |
| Capacitor **35** | do | .01 |
| Resistor **36** | kiloohms | 22 |
| Capacitor **43** | micromicrofarads | 680 |
| Devices **31**, **32** | | 3AU7 |
| Resistor **44** | kiloohms | 120 |
| Resistor **45** | do | 100 |
| Capacitor **48** | micromicrofarads | 390 |
| Resistor **49** | ohms | 4700 |
| Capacitor **50** | micromicrofarads | 5000 |

The modification of the invention shown in Fig. 3 is generally similar to that of Fig. 1, and like elements have been indicated by like numerals.

In the latter embodiment, the cathode of devices 31, 32 are returned to ground through a common cathode resistor 70, and the control electrode of device 31 is connected to ground through an inductive winding 71 and a by-pass capacitor 72, the inductive winding being inductively coupled to inductance coil 38 in ringing circuit 37.

In a constructed embodiment of the invention, resistor 70 was given a value of one kiloohm and capacitor 72 a value of .01 microfarad.

It can be seen that the embodiment of Fig. 3 differs from that of Fig. 1 in that the ringing signal across network 37 is fed back to the grid circuit of device 31 rather than to the common cathode circuit of the devices 31, 32.

It is evident that the inductive coupling of windings 40 and 71 to inductance coil 38 can be modified, for example, coil 38 can itself be tapped and act as an autotransformer.

The invention provides, therefore, a simple and commercially practical sweep signal generating system that operates at a stabilized frequency even in the presence of relatively low anode exciting voltages.

I claim:

In an indirectly synchronized sweep-signal generating system for a television receiver in which there is provided a unidirectional automatic frequency control voltage varying with respect to a reference potential, a multivibrator comprising first and second electron discharge devices each having anode, cathode and control electrodes, an input circuit including a capacitor connecting said control electrode of said first device to the reference potential and means for applying the control voltage to the control electrode of said first device to control the frequency of said multivibrator, an anode circuit connecting the anode of said first device to a first source of unidirectional energizing potential, a parallel-resonant ringing network included in said anode circuit for stabilizing the controlled frequency of said multivibrator, said ringing network including an inductance coil and a shunt-connected capacitor, a common cathode feedback circuit connecting the cathodes of said first and second devices to the reference potential, an inductance winding included in said cathode circuit and inductively coupled to said inductance coil in said ringing network for feeding energy from said anode circuit to said cathode circuit in regenerative phase to assist in the stabilization of said multivibrator, capacitor means coupling said anode of said first device to said control electrode of said second device, grid lead means coupling said last mentioned control electrode to the reference point, and an output circuit coupled to said anode of said second device and including a connection to a second source of uni-directional energizing potential higher than said first source.

References Cited in the file of this patent

UNITED STATES PATENTS

| | | |
|---|---|---|
| 2,419,772 | Gottier | Apr. 29, 1947 |
| 2,553,752 | De Lange | May 22, 1951 |
| 2,582,697 | Hepp | Jan. 15, 1952 |
| 2,628,313 | Schlesinger | Feb. 10, 1953 |
| 2,645,717 | Massman | July 14, 1953 |
| 2,743,364 | Kraft | Apr. 24, 1956 |
| 2,782,309 | Aasma | Feb. 19, 1957 |

FOREIGN PATENTS

| | | |
|---|---|---|
| 664,768 | Great Britain | Jan. 9, 1952 |